United States Patent

Horikawa

[19]

[11] Patent Number: 5,963,741
[45] Date of Patent: Oct. 5, 1999

[54] INFORMATION PROCESSOR WHICH REWRITES INSTRUCTIONS IN PROGRAM TO DYNAMICALLY CHANGE PROGRAM STRUCTURE AND METHOD THEREFOR

[75] Inventor: Takashi Horikawa, Tokyo, Japan

[73] Assignee: NEC Corporation, Tokyo, Japan

[21] Appl. No.: 09/015,506

[22] Filed: Jan. 29, 1998

[30] Foreign Application Priority Data

Jan. 29, 1997 [JP] Japan ................................. 9-015593

[51] Int. Cl.$^6$ ........................................................ G06F 9/44
[52] U.S. Cl. ........................... 395/704; 712/35; 712/38
[58] Field of Search ........................... 395/701, 702, 395/703, 704, 705, 709; 712/227, 233, 237; 714/25, 32, 35, 38

[56] References Cited

U.S. PATENT DOCUMENTS

| | | | |
|---|---|---|---|
| 4,819,233 | 4/1989 | Delucia et al. | 395/704 |
| 4,831,517 | 5/1989 | Crouse et al. | 395/182.06 |
| 4,866,665 | 9/1989 | Haswell-Smith | 395/704 |
| 5,265,254 | 11/1993 | Blasciak et al. | 395/704 |
| 5,313,616 | 5/1994 | Cline et al. | 395/500 |
| 5,450,586 | 9/1995 | Kuzara et al. | 395/704 |
| 5,454,086 | 9/1995 | Alpert et al. | 395/568 |
| 5,481,705 | 1/1996 | Watanabe et al. | 395/704 |
| 5,507,028 | 4/1996 | Liu | 395/383 |
| 5,671,417 | 9/1997 | Miclette et al. | 395/704 |
| 5,710,724 | 1/1998 | Burrows | 395/704 |
| 5,729,676 | 3/1998 | Inoue | 395/702 |
| 5,732,273 | 3/1998 | Srivastava et al. | 395/704 |
| 5,781,776 | 7/1998 | Johnston et al. | 395/704 |
| 5,850,551 | 12/1998 | Takayama et al. | 395/708 |
| 5,887,173 | 3/1999 | Ogawa et al. | 395/704 |

FOREIGN PATENT DOCUMENTS

| | | |
|---|---|---|
| 1-274253 | 11/1989 | Japan . |
| 2-284236 | 11/1990 | Japan . |
| 4-33135 | 2/1992 | Japan . |
| 5-216649 | 8/1993 | Japan . |
| 5-241889 | 9/1993 | Japan . |
| 6-110678 | 4/1994 | Japan . |
| 7-73032 | 3/1995 | Japan . |
| 8-147155 | 6/1996 | Japan . |
| 8-255096 | 10/1996 | Japan . |

OTHER PUBLICATIONS

NEC Literature, "Guidance to C Programming", (NEC UX Software Manual WTY 18–1), 1994, pp. 313–401.

Primary Examiner—Robert W. Downs
Assistant Examiner—Kakali Chaki
Attorney, Agent, or Firm—Sughrue, Mion, Zinn, Macpeak & Seas, PLLC

[57] ABSTRACT

An information processor comprises a program storage unit and a control unit, the control unit includes a procedure insertion table in which information regarding an embedding point in a program and information regarding an insertion procedure to be inserted in the embedding point are described in correlation with each other, and a program dynamically changing unit for saving an instruction at an embedding point of the program held in the program storage unit in a predetermined instruction saving region with reference to the procedure insertion table, rewriting the last instruction of an insertion procedure into a branch instruction to branch to an instruction subsequent to a saved instruction, and writing the branch instruction to branch to the insertion procedure at the embedding point, thereby, at the time of execution of the insertion procedure, executing the instruction saved in the instruction saving region immediately before executing the last branch instruction.

10 Claims, 6 Drawing Sheets

PROCEDURE INSERTION TABLE 24

| EMBEDDING POINT | INSERTION PROCEDURE |
|---|---|
| ADDRESS OF EMBEDDING POINT A | ADDRESS OF INSERTION PROCEDURE AH |
| ADDRESS OF EMBEDDING POINT C | ADDRESS OF INSERTION PROCEDURE CH |

PROCEDURE INSERTION TABLE ~24

| EMBEDDING POINT | INSERTION PROCEDURE | |
|---|---|---|
| ADDRESS OF EMBEDDING POINT A | SIZE OF INSERTION PROCEDURE AH | POSITION OF INSERTION PROCEDURE AH ON EXTERNAL RECORDING DEVICE |
| ADDRESS OF EMBEDDING POINT C | SIZE OF INSERTION PROCEDURE CH | POSITION OF INSERTION PROCEDURE CH ON EXTERNAL RECORDING DEVICE |

INFORMATION PROCESSOR WHICH REWRITES INSTRUCTIONS IN PROGRAM TO DYNAMICALLY CHANGE PROGRAM STRUCTURE AND METHOD THEREFOR

BACKGROUND OF THE INVENTION

1. Field of the Invention

The present invention relates to an information processor having a function of dynamically incorporating a behavior measuring procedure by rewriting instructions of a program to dynamically change structure of the program, and a method therefor.

2. Description of the Related Art

Debugger for use in detecting errors in computer programs is capable, during the execution of a predetermined computer program, of conducting operation of interrupting the execution to rewrite instructions of the computer program and change operation which is based on the computer program. With this function, execution of a computer program is interrupted at a place (break point) on the computer program designated by a programmer to shift control to the debugger, thereby allowing a programmer to input a debug command. One of conventional debuggers of this kind is recited, for example, in the ninth and the tenth chapters of the literature "Guidance to C Programming" (NEC UX Software Manual WTY 18-1) (hereinafter referred to as Literature 1).

The debugger recited in Literature 1 is the one for debugging an application program (AP program) running under control of an operating system (OS). The debugger is capable of operating as other process (referred to as a debugger process here) than a process in which an AP program runs (referred to as an AP process here) and is capable of accessing a memory in the AP process. For a programmer to set a break point in the AP process, he rewrites an instruction at a position at which the break point is to be set into an instruction to shift control to the debugger by making use of the function of accessing a memory in the AP process from the debugger process. As a result, when the execution of the AP program reaches the break point, the control shifts to the debugger process to wait for programmer's input of a debug command.

When the execution of the AP program reaches a break point, the debugger recited in the ninth chapter of Literature 1 is allowed to resume the execution of the AP program after sequentially executing combinations of commands (command group) prepared in the debugger. The command group is set at a break point in advance by a user. On the other hand, the debugger recited in the tenth chapter of Literature 1 is capable of executing a series of debugger commands written in a file at the start-up. It is therefore possible to set break points at a plurality of places at the time of start-up of the debugger. In any of the debuggers, instructions to be set at a break point are of a kind to shift control to the debugger. Also, the debuggers operate according to an executed break point. Operation for finding which break point has been executed is accordingly necessary.

In addition, in the debugger of Literature 1, execution of a break point in an AP program always results in shifting control to the debugger. An AP program in which a break point is set therefore can be executed only when the debugger operates, and terminates its operation when the debugger is finished.

With the debugger of Literature 1, executing operation designated at a break point is only a combination of debugger commands and none of arbitrary procedures can be executed.

A debugger for detecting errors in an operating system is also the same in its basic operation as a debugger intended for an AP program. For using the debugger of this kind, it is necessary to start a system with the debugger incorporated therein and run an operating system under control of this debugger.

Debuggers are thus used in a peculiar mode different from a normal operation mode (hereinafter referred to as a normal operation mode). This disables common users of information processors to use a debugger in most cases. Common users are therefore not allowed to conduct operation of dynamically changing the information processor from a normal operation mode to a special mode in which an arbitrary operation which was defined previously is executed just after when the execution reaches to a specific point in the operating system and then subsequent operation of the operating system will be executed (hereinafter referred to as a changed operation mode).

Another example of conventional debuggers is disclosed in Japanese Patent Laying-Open (Kokai) No. Heisei 1-274253, entitled "Software Break System" (hereinafter referred to as Literature 2). Recited in Literature 2 is a technique to have a break point setting means for rewriting machine words at break points into instructions to branch to break processing, a debugged program stopping means for, when debug processing is executed by a debugger, stopping execution of a debugged program, an execution means for executing debug processing, and a debugged program execution starting means for resuming execution of a debugged program after the completion of debug processing, thereby using a sub-routine branch instruction at a break point to branch from the debugged program to a routine in the debugger. According to this conventional art, however, since a program to be debugged in which break points are to be embedded needs to be placed under control of a debugger, a debugger is essential for rewriting instructions.

A further example of conventional debuggers is disclosed in Japanese Patent Laying Open (Kokai) No. Heisei 2-284236, entitled "Program Debug Processing Device" (hereinafter referred to as Literature 3). Recited in Literature 3 is a debug processing means for executing debug processing including a means for executing, as a dummy, a first instruction as a target of processing after execution of debug processing, a means for returning, to the first instruction, a first branch instruction to shift the first instruction to the debug processing, a means for embedding a second branch instruction to shift processing to the debug processing in a second instruction as a target of the debug processing to be conducted next, a means for setting an address at which the first instruction resides to a program counter, and a means for returning control to a debugged program. The conventional technique, however, is not effective as a means for modifying a program structure permanently because when the debugger is started by a break point, operation of restoring a saved instruction is conducted therein.

Still further example of conventional debuggers is disclosed in Japanese Patent Laying-Open (Kokai) No. Heisei 4-33135, entitled "Program Debugging System" (hereinafter referred to as Literature 4). Recited in Literature 4 is a technique of saving instructions of a main part of a program to be debugged and instead writing a procedure call-up instruction to call a debugger, starting the debugger by the procedure call-up instruction when the procedure call-up instruction is executed during the execution of the program to be debugged, and further, returning saved instructions to the original part by the debugger, thereby conducting debug processing.

Still further example of conventional debuggers is disclosed in Japanese Patent Laying-Open (Kokai) No. Heisei 5-241889, entitled "Machine Instruction Step Execution System" (hereinafter referred to as Literature 5). Recited in Literature 5 is a technique facilitating designation of interruption of step execution until a loop ends by taking, when a conditional branch instruction to conduct loop end control is given, an instruction at which a break point is to be set next as an instruction to which the branch instruction is to jump or the subsequent instruction, irrespective of whether branch conditions are satisfied or not.

Still further example of conventional debuggers is disclosed in Japanese Patent Laying Open (Kokai) No. Heisei 7-73032, entitled "Method of Dynamically Modifying Software System" (hereinafter referred to as Literature 6). Recited in Literature 6 is a technique of facilitating debug of ROM-based embedded software by inserting a customizable call-out request through ROM-based embedded software by means of an extensible interpreter.

Still further example of conventional debuggers is disclosed in Japanese Patent Laying-Open (Kokai) No. Heisei 8-255096, entitled "Microprocessor and Debug System" (hereinafter referred to as Literature 7). Recited in Literature 7 is a system including a processor core for executing a user program and a monitor program for debugging a user target system, and a debug module having an interface function for enabling the processor core to execute the monitor program and an execution control function for enabling the processor core, during the execution of the user program, to request an interruption to shift from the user program to the monitor program, thereby facilitating connection between the user target system and a debugger.

Still further example of conventional debuggers is disclosed in Japanese Patent Laying-Open (Kokai) No. Heisei 8-147155, entitled "Object Program Instruction Changing/Inserting Method and System Therefor" (hereinafter referred to as Literature 8). Recited in Literature 8 is a technique of once reversely assembling an object program whose instructions are to be changed or in which instructions are to be inserted to convert into a source program and after making predetermined changes, reassembling the program to generate an object program whose instructions have been changed or in which instructions have been inserted.

An example of conventional art of rewriting instructions in a program in order to dynamically change the structure of the program is disclosed in Japanese Patent Laying-Open (Kokai) No. Heisei 6-110678, entitled "Program Execution System and Execution Program Dynamically Changing Method" (hereinafter referred to as Literature 9). Recited in Literature 9 is a technique of correcting a bug of a former sub-routine to prepare a new sub-routine corresponding to the former sub-routine, and replacing a leading instruction of the former sub-routine by an instruction branching to the new sub-routine, thereby enabling an execution module including the former sub-routine to be replaced without stopping with an execution module including the new sub-routine. The technique of Literature 9, however, is intended to change an original instruction execution path to replace the entire sub-routine and is therefore impossible to insert an arbitrary procedure in the middle of the original instruction execution path and resume execution immediately after a replaced instruction.

Another example of conventional art of rewriting instructions in a program in order to dynamically change the structure of the program is disclosed in Japanese Patent Laying-Open (Kokai) No. Heisei 5-216649, entitled "System Program Dynamically Changing System" (hereinafter referred to as Literature 10). Recited in Literature 10 is a technique to have a means for receiving input of an additional instruction and registering the same, and an interruption instruction managing means and an interruption instruction executing means for executing the additional instruction, thereby modifying a system program without interrupting user's work processing. The technique recited in Literature 10, however, needs to manage an interruption instruction in addition to an original instruction execution path because an additional instruction is executed by interruption processing.

As described in the foregoing, conventional information processors have a drawback that a dynamic change of operation of an operating system is impossible which change is accompanied by a series of processing of setting a break point in the course of execution of the operating system in the normal operation mode, causing operation designated in advance at the point and then again resuming execution of the operating system.

Another shortcoming is that while an information processor is in operation, it is impossible to dynamically change operation of an operating system so that an arbitrary insertion procedure can be executed in the course of the execution of the operating system.

A further shortcoming is that because only one kind of instruction can be used at each procedure insertion position in an operating system, operation of detecting which procedure insertion position is executed is required to cost enormous processing time.

SUMMARY OF THE INVENTION

An object of the present invention is to provide an information processor enabling operation of an operating system to be dynamically changed and a method therefor.

Another object of the present invention is to provide an information processor enabling an arbitrary insertion procedure to be designated as operation to be executed at a break point and a method therefor.

A further object of the present invention is to provide an information processor which uses, at each procedure insertion position in an operating system, an instruction to branch to an insertion procedure corresponding to the procedure insertion position to eliminate the need of operation of detecting which procedure insertion position has been executed and a method therefor.

According to the first aspect of the invention, an information processor which rewrites instructions in a program to dynamically change structure of the program, comprises program storage means for storing a program, and control means for executing a program stored in the program storage means, the control means includes a procedure insertion table in which information regarding an embedding point in the program and information regarding an insertion procedure to be inserted in the embedding point are described in correlation with each other, and program dynamically changing means for saving an instruction at the embedding point of the program held by the program storage means in a instruction saving region with reference to the procedure insertion table, rewriting the last instruction of the insertion procedure into a branch instruction to branch to an instruction subsequent to the saved instruction, and writing the branch instruction to branch to the insertion procedure at the embedding point, wherein at the time of execution of the insertion procedure, an instruction saved in the instruction saving region is executed immediately prior to execution of the last branch instruction.

The information processor may further comprise recording means for recording predetermined data, wherein the control means further includes data output means for outputting measurement data indicative of operation conditions of the information processor detected by the insertion procedure to the recording means.

In the preferred construction, the program storage means stores a procedure to be executed at the normal operation mode of the information processor and the insertion procedure.

The information processor may further comprise insertion procedure storage means for storing the insertion procedure independent of the program storage means, wherein the control means further includes assignment means for ensuring a region in the program storage means with reference to the procedure insertion table, as well as reading the insertion procedure from the insertion procedure storage means and storing the same in the region ensured in the program storage means prior to the processing by the program dynamically changing means.

According to the second aspect of the invention, an information processing method of rewriting instructions in a program to dynamically change structure of the program, comprising the steps of:

referring to a procedure insertion table in which information regarding an embedding point in the program and information regarding an insertion procedure to be inserted in the embedding point are described in correlation with each other to save an instruction at the embedding point of the program held by the program storage device in a predetermined instruction saving region, rewriting the last instruction of the insertion procedure into a branch instruction to branch to an instruction subsequent to a saved instruction, and writing a branch instruction to branch to the insertion procedure at the embedding point, wherein at the time of execution of the insertion procedure, an instruction saved in the instruction saving region is executed immediately prior to execution of the last branch instruction.

In this case, when the insertion procedure is executed, measurement data indicative of operation conditions of the information processor detected by the insertion procedure is output before the execution of an instruction saved in the instruction saving region.

In the preferred construction, the information processing method further comprising, prior to the instruction saving step, the steps of:

referring to the procedure insertion table to ensure a region of the program storage means, and storing the insertion procedure in the region of the program storage means ensured at the region ensuring step.

According to the third aspect of the invention, a computer readable memory storing a control program for controlling an information processor which rewrites instructions in a program to dynamically change structure of the program, the control program comprising the steps of:

referring to a procedure insertion table in which information regarding an embedding point in the program and information regarding an insertion procedure to be inserted in the embedding point are described in correlation with each other to save an instruction at the embedding point of the program held by the program storage device in a predetermined instruction saving region, rewriting the last instruction of the insertion procedure into a branch instruction to branch to an instruction subsequent to a saved instruction, and writing a branch instruction to branch to the insertion procedure at the embedding point, wherein at the time of execution of the insertion procedure, an instruction saved in the instruction saving region is executed immediately prior to execution of the last branch instruction.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENTS

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
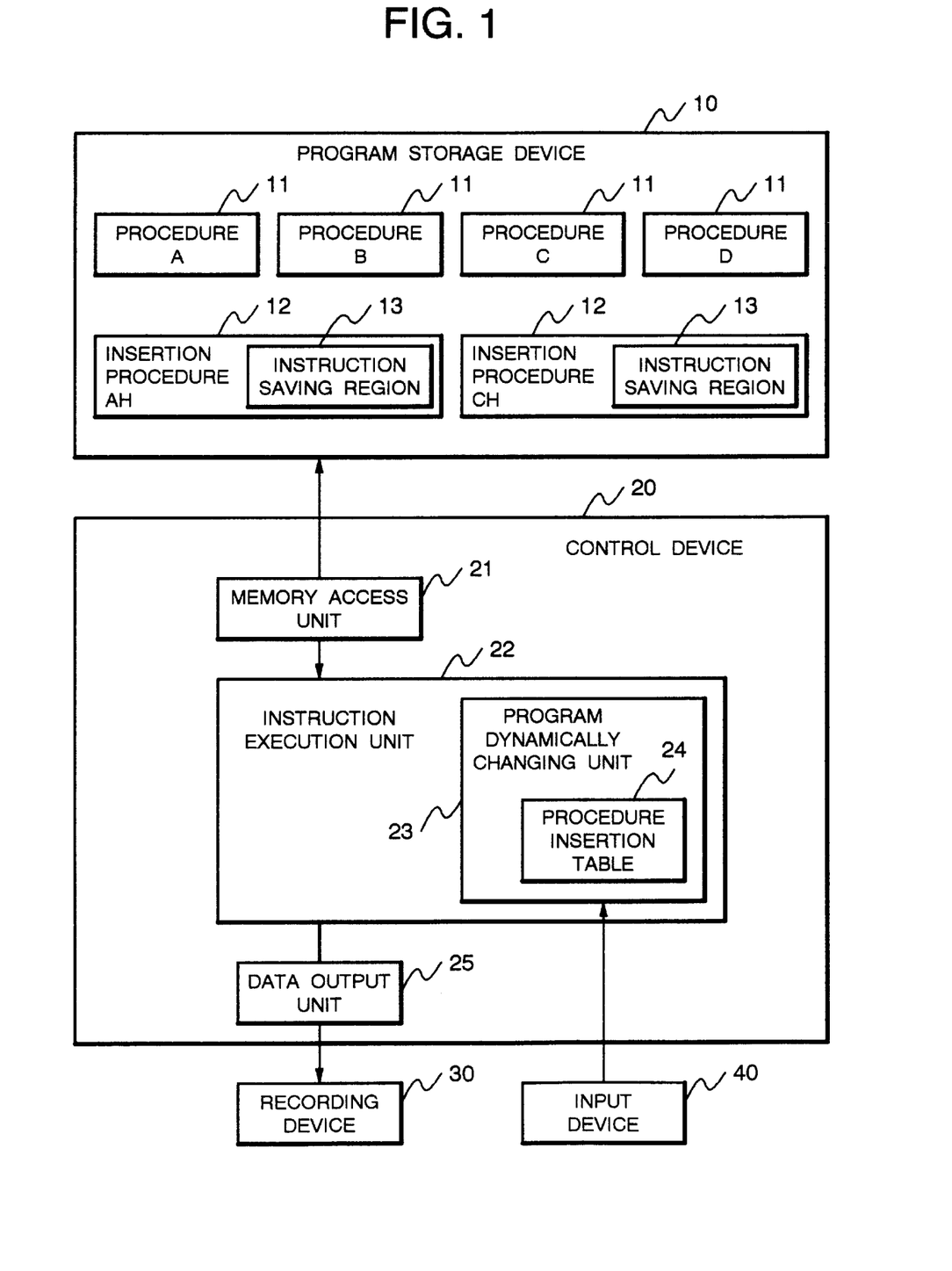
FIG. 1 is a block diagram showing structure of an information processor according to a first embodiment of the present invention.

FIG. 1 is a block diagram showing structure of an information processor according to a first embodiment of the present invention. With reference to FIG. 1, the information processor of the present embodiment includes a program storage device 10 for storing a program, a control device 20 and a recording device 30 which operate under control of a program. In addition, an input device 40 is connected to the control unit 20 for applying various data and instructions thereto. In FIG. 1, illustration is made only of a characteristic part of the structure of the present embodiment and that of the remaining common part is omitted.

The program storage device 10, which is implemented by an external storage device such as a magnetic disk device, stores programs classified into procedures 11 to be executed at both a normal operation mode and a changed operation mode in the present embodiment and insertion procedures 12 to be executed only at the changed operation mode. As illustrated in the figure, each insertion procedure 12 includes an instruction saving region 13.

Figure 3:
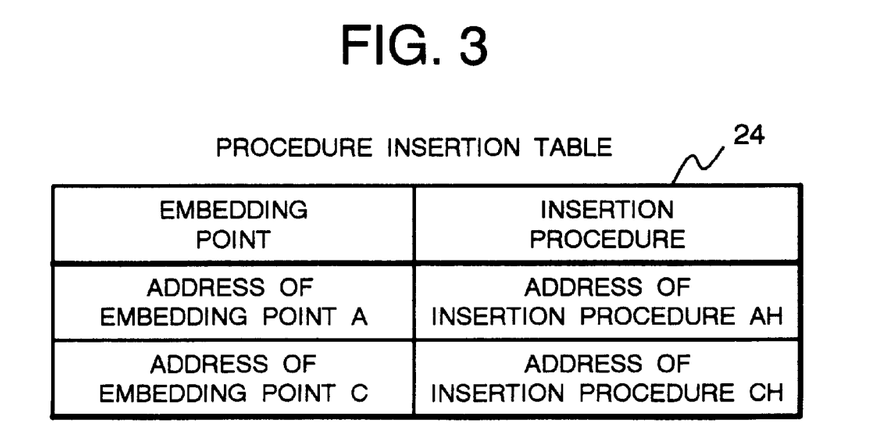
FIG. 3 is a diagram showing an example of the contents of an insertion procedure table according to the first embodiment.

The control device 20, which is implemented by a CPU and an internal memory such as a RAM, includes a memory access unit 21 for accessing the program storage device 10, an instruction execution unit 22 for executing instructions, and a data output unit 25 for outputting data to the storage device 30. The instruction execution unit 22 includes a program dynamically changing unit 23 having a procedure insertion table 24 for changing the state of the information processor from the normal operation mode to the changed operation mode. Written in the procedure insertion table 24, as shown in FIG. 3, are an embedding point on the program and its corresponding insertion procedure 12 to be inserted at the embedding point.

Figure 2:
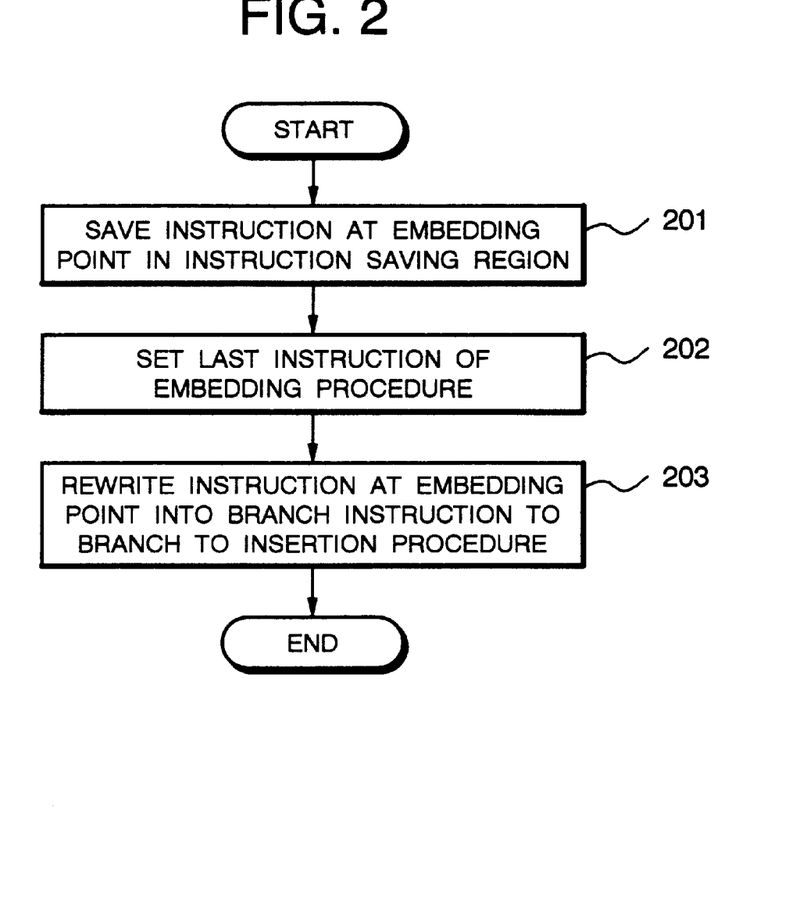
FIG. 2 is a flow chart showing main operation of a program dynamically changing unit of the first embodiment.

The program dynamically changing unit 23 changes the state of the information processor from the normal operation mode to the changed operation mode by changing instructions of the procedure 11 stored in the program storage device 10 with respect to each embedding point recited in the procedure insertion table 24 in response to a start-up instruction from the input device 40. Operation of the program dynamically changing unit 23 is shown in the flow chart of FIG. 2. Upon receiving a start-up instruction from the input device 40, the program dynamically changing unit 23 refers to the procedure insertion table 24 to conduct the following operation shown in the flow chart of FIG. 2 with respect to each embedding point recited in the table. First, the unit 23 saves an instruction at a target embedding point in an instruction saving region 13 of an insertion procedure 12 correlated by the procedure insertion table 24 (Step 201). Next, the unit 23 rewrites the last instruction of the insertion procedure 12 so as to branch to an instruction subsequent to the instruction saved at Step 201 (Step 202). Lastly, the unit 23 rewrites the instruction at the embedding point into a branch instruction to branch to the insertion procedure 12 (Step 203).

When the information processor thus enters the changed operation mode, the instruction execution unit 22 executes the program stored in the program storage device 10 and when the execution of the program reaches a predetermined embedding point, a branch instruction to branch to the insertion procedure 12 embedded at the embedding point is executed. As a result, the insertion procedure 12 is read by the control unit 20 and executed by the instruction execution unit 22. Then, following procedures programmed in advance in the insertion procedure 12, the instruction execution unit 22 collects necessary information from the information processor and outputs the same to the recording device 30 through the data output unit 25. Thereafter, the unit 22 executes an instruction saved in the instruction saving region 13 of the insertion procedure 12 and resumes execution starting with an instruction subsequent to the instruction saved at the embedding point.

The above-described instruction execution unit 22 including the program dynamically changing unit 23 is implemented by the control of the CPU of the control device 20 by a computer program. The computer program is provided as storage in a storage medium such as a magnetic disk or a semiconductor memory and is loaded into the control device 20.

The recording medium 30, which is implemented by an external storage device such as a magnetic disk device, stores information sent from the control device 20.

The input device 40, which is implemented, for example, by a pointing device such a keyboard or a mouse, receives input of a start-up instruction to start the program dynamically changing unit 23 of the control unit 20.

Figure 4A:
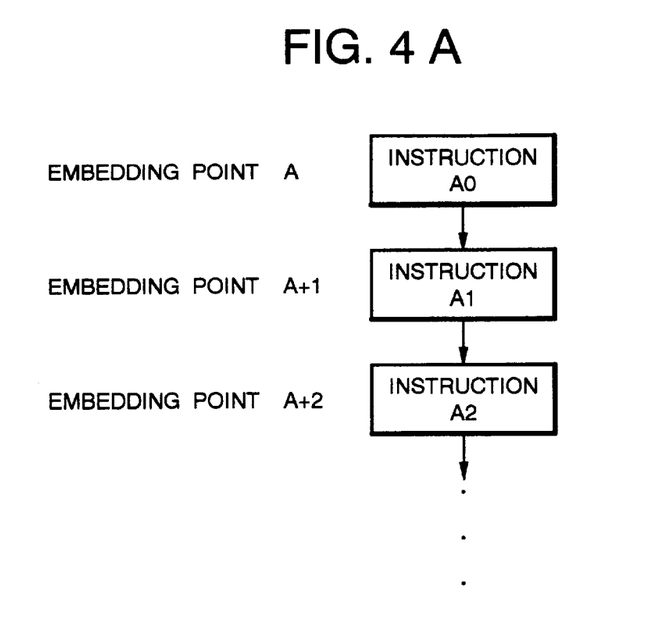
FIG. 4A is a diagram showing the contents of instructions in the vicinity of an embedding point at a normal operation mode according to the first embodiment.
Figure 4B:
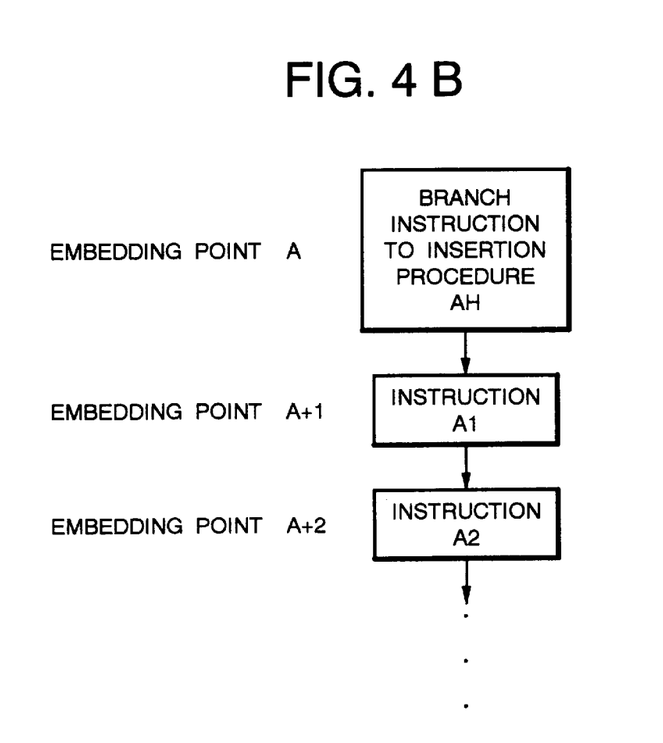
FIG. 4B is a diagram showing the contents of instructions in the vicinity of an embedding point at a changed operation mode according to the first embodiment.
Figure 5:
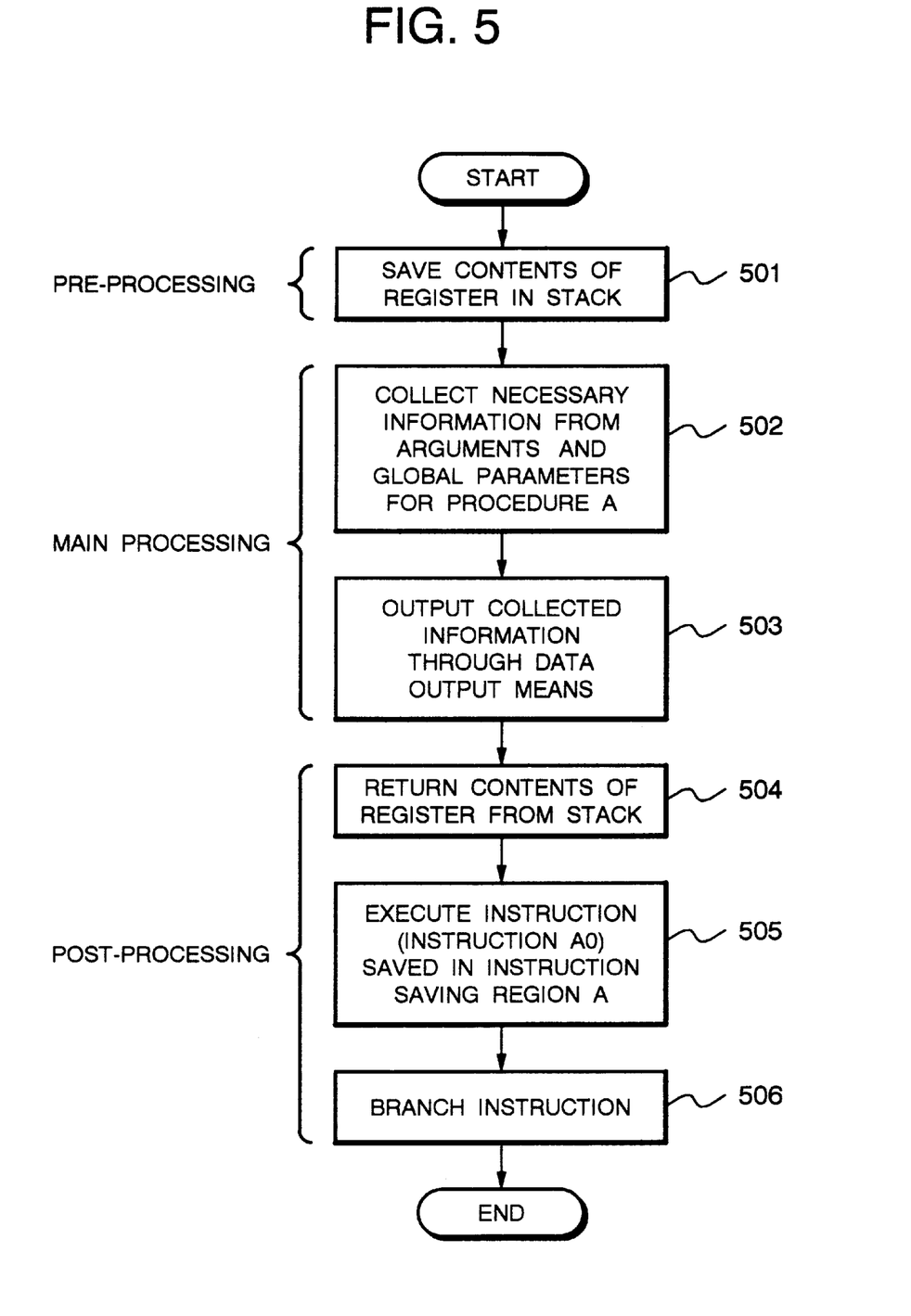
FIG. 5 is a flow chart showing main operation of an insertion procedure according to the first embodiment.

Operation of the present embodiment will be described next. In the present operation example, registered in correlation with each other in the procedure insertion table 24 as shown in FIG. 3 are an address of an embedding point 'A' and an address of an insertion procedure 'AH' corresponding to the embedding point 'A', and an address of an embedding point 'C' and an address of an insertion procedure 'CH' corresponding to the embedding point 'C'. FIGS. 4A and 4B are diagrams showing the operation mode at an embedding point before and after change, while FIG. 5 is a flow chart showing main operation in the insertion procedure 'AH'.

Upon input of a start-up instruction to start the program dynamically changing unit 23 from the input device 40, the program dynamically changing unit 23 is started in response to the start-up instruction to read the first entry of the procedure insertion table 24 and obtain addresses of the embedding point 'A' and the insertion procedure 'AH'. Then, using the obtained address of the embedding point, the unit 23 first saves an instruction 'A0' resides at the address 'A' of the program storage device 10 in an instruction saving region (A) 13 in the insertion procedure 'AH' (see Step 201).

Next, the program dynamically changing unit 23 sets a branch destination address of a branch instruction to be executed last in the insertion procedure 'AH' to be an address 'A1' at which an instruction subsequent to the instruction saved at the embedding point 'A' is located (see Step 202). As a result, a branch instruction to be executed at Step 506 of the insertion procedure 'AH' shown in FIG. 5 will be represented as 'Jmp A+1'.

Lastly, the unit 23 rewrites the instruction A0 at the embedding point A into a branch instruction 'Jmp AH' to branch to the insertion procedure (see Step 203). The foregoing operation results in changing the state of the embedding point 'A' from the state shown in FIG. 4A to that shown in FIG. 4B. The same operation will be conducted with respect to the embedding point 'C' and the insertion procedure 'CH' registered second in the procedure insertion table 24. The series of operation changes the state of the information processor from the normal operation mode to the changed operation mode.

With reference to FIG. 4B, upon execution of the program at the changed operation mode of the information processor to reach the embedding point 'A', the branch instruction 'Jmp AH' to branch to the insertion procedure 'AH' is executed, which is followed by the execution of the insertion procedure 'AH'.

With reference to FIG. 5, the insertion procedure 'AH' is composed of three stages, pre-processing, main processing and post-processing, and in the pre-processing, the contents of a register are saved in a stack (Step 501). Then, in the main processing, necessary information is collected from arguments and global parameters for the procedure 'A' (Step 502) and output to the recording device 30 through the data output unit 25 (Step 503). Output here as a hardware signal which can be observed outside the information processor is the information collected at Step 502. The recording device 30 attaches time information to the output information and records the obtained information as time series data. Next, in the post-processing, the contents of the register saved at Step 501 are returned from the stack (Step 504) to execute the instruction 'A0' saved in the instruction saving region (A) 13 (Step 505) and execute the branch instruction (Step 506). Since a branch destination address of the branch instruction is set at Step 202 of FIG. 2 to be an address at which the instruction 'A+1' subsequent to the embedding point 'A' is located, the program will be executed starting with the instruction 'A+1' after the execution of the insertion procedure 'AH'. As long as the insertion procedure 'AH' is designed to avoid operation of rewriting global parameters and local parameters, each parameter value immediately before the execution of the instruction 'A+1' at the changed operation mode will be completely the same as that immediately before the execution of the instruction 'A+1' at the normal operation mode. As to the contents of the register, since the contents immediately before the execution of the instruction 'A0' at the normal operation mode are saved at Step 501 and returned at Step 504 to execute the instruction 'A0' at Step 505, the contents of the register immediately before the execution of the instruction 'A+1' will be the same as those at the normal operation mode.

As described in the foregoing, execution of the program at the normal operation mode and that of the program at the changed operation mode are completely the same, with the only difference being that the execution at the changed operation mode needs an extra time for executing an insertion procedure.

Figure 6:
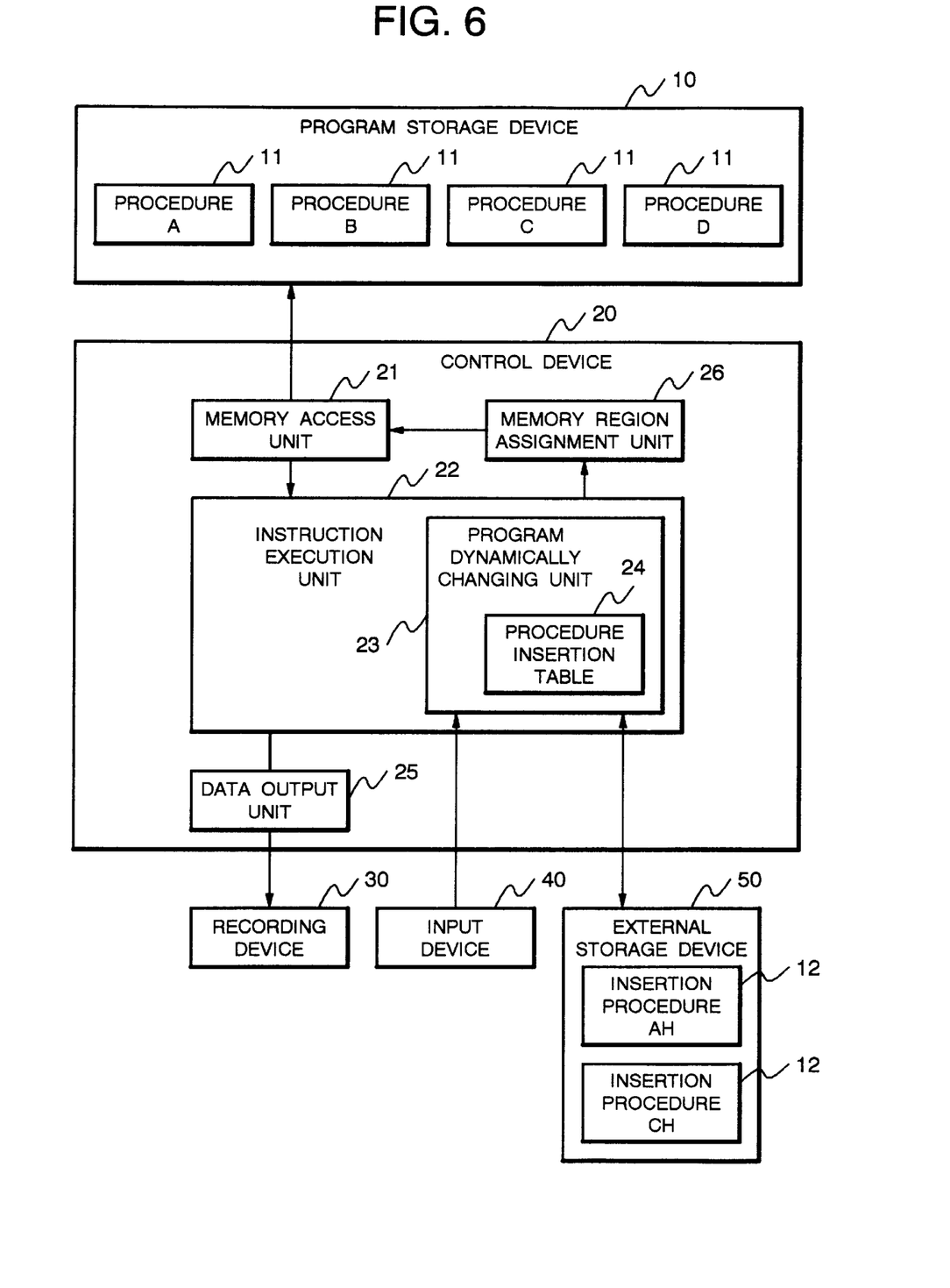
FIG. 6 is a block diagram showing structure of an information processor according to a second embodiment of the present invention.

FIG. 6 is a block diagram showing structure of an information processor according to a second embodiment of the present invention. With reference to FIG. 6, the information processor of the present embodiment includes a program storage device 10 for storing a program, a control device 20 and a recording device 30 which operate under control of a program, and an insertion procedure storage device 50 for storing an insertion procedure. In addition, an input device 40 is connected to the control device 20 for applying various data and instructions thereto. In FIG. 6, illustration is made only of a characteristic part of the structure of the present embodiment and that of the remaining common part is omitted.

In the present embodiment, an insertion procedure 12 resides at the insertion procedure storage device 50 implemented by an external storage device such as a magnetic disk device and is accordingly not stored in the program storage device 10. The program storage device 10 and the insertion procedure storage device 50 may be physically implemented by the same external storage device.

The control unit 20 includes, similarly to the control unit 20 of the first embodiment shown in FIG. 1, a memory access unit 21, an instruction execution unit 22 and a data output unit 25 and further includes a memory region assignment unit 26 for ensuring a predetermined region in the program storage device 10. Shown in FIG. 7 is operation of the memory region assignment unit 26 and that of a program dynamically changing unit 23 in the instruction execution unit 22.

Figure 7:
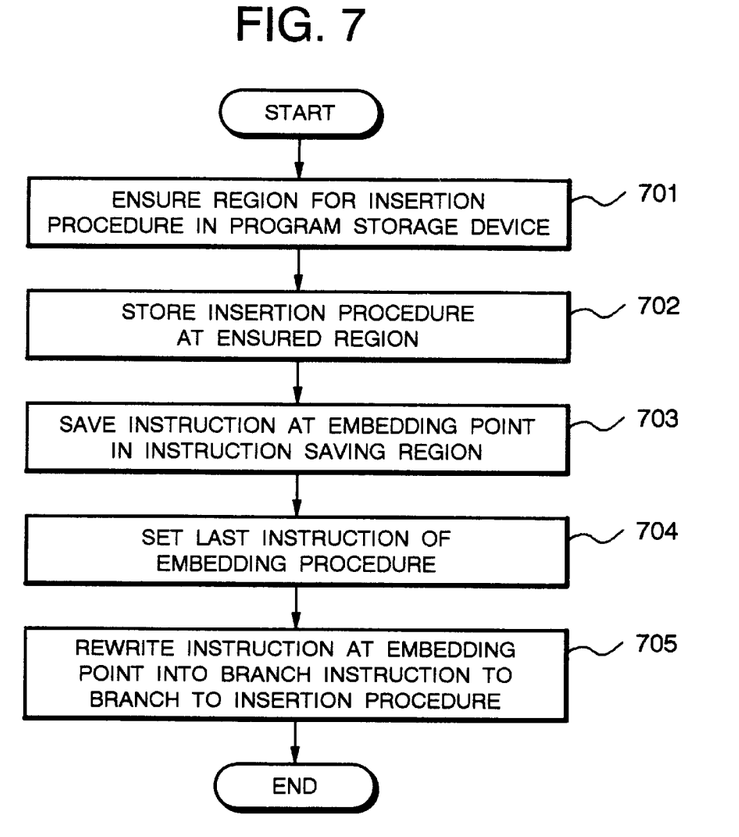
FIG. 7 is a flow chart showing main operation of a memory region assignment unit and a program dynamically changing unit of the second embodiment.

With reference to FIG. 7, the memory region assignment unit 26 ensures a region for storing an insertion procedure 12 in the program storage device 10 prior to the processing by the program dynamically changing unit 23 according to the present embodiment (Step 701). Then, the unit 26 stores the insertion procedure 12 read from the insertion procedure storage device 50 at the ensured region (Step 702). Since the following operation at Steps 703 to 705 is the same as that at Steps 201 to 203 of the first embodiment shown in FIG. 2, no description thereof will be made.

Figure 8:
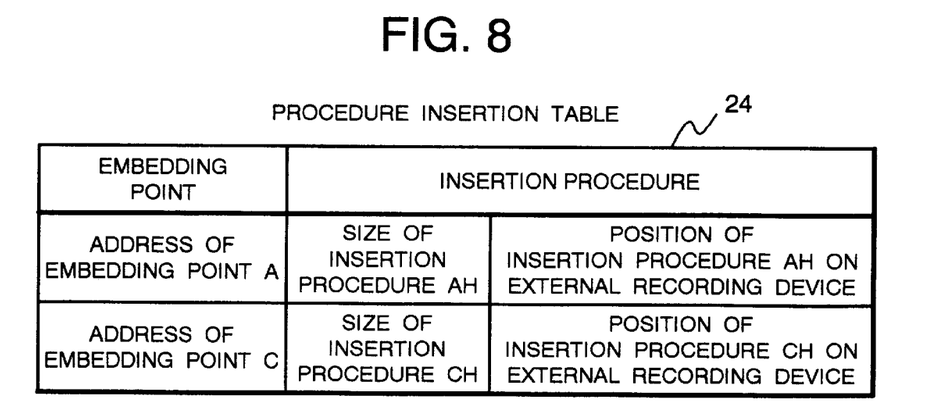
FIG. 8 is a diagram showing an example of the contents of an insertion procedure table according to the second embodiment.

As shown in FIG. 8, described in a procedure insertion table 24 included in the program dynamically changing unit 23 are, as information regarding an insertion procedure 12 corresponding to an embedding point, the size of the insertion procedure 12 and a storage position (address) of the insertion procedure 12 at the insertion procedure storage device 50.

The remaining components of the present embodiment are the same as those of the first embodiment shown in FIG. 1, to which the same reference numerals are allotted to omit their description. The memory region assignment unit 26 is realized by the control of the CPU of the control device 20 by a computer program. The computer program is provided as storage in a storage medium such as a magnetic disk or a semiconductor memory and is loaded into the control device 20 similarly to the above-described computer program which implements the instruction execution unit 22.

Next, operation of the present embodiment will be described. In the present operation example, registered in correlation with each other in the procedure insertion table 24 as shown in FIG. 8 are an address of an embedding point 'A' and size and storage position at the insertion procedure storage device 50 of an insertion procedure 'AH' corresponding to the embedding point 'A', and an address of an embedding point 'C', size and storage position at the insertion procedure storage device 50 of an insertion procedure 'CH' corresponding to the embedding point 'C'.

Upon input of a start-up instruction to start the program dynamically changing unit 23 from the input device 40, the program dynamically changing unit 23 is started in response to the start-up instruction to read the first entry of the procedure insertion table 24 and obtain the embedding point 'A', the size of the insertion procedure 'AH' and the storage position at the insertion procedure storage device 50. Then, the unit 23 transfers the obtained information to the memory region assignment unit 26. The memory region assignment unit 26 ensures a region equivalent to the size of the insertion procedure 'AH' in the program storage device 10 based on the information received from the program dynamically changing unit 23 (Step 701). Next, based on the information regarding the position of the insertion procedure 'AH' in the insertion procedure storage device 50, the unit 26 reads the insertion procedure 'AH' from the insertion procedure storage device 50 and records the procedure at the region ensured at Step 701 (Step 702). Then, the control shifts to the processing by the program dynamically changing unit 23. The operation of the program dynamically changing unit 23 is the same as that in the first embodiment shown in FIG. 2 as described above.

The same operation is conducted with respect to the embedding point 'C' and the insertion procedure 'CH' registered second in the procedure insertion table 24. The series of operation results in changing the state of the information processor from the normal operation mode to the changed operation mode.

According to the present embodiment, in the second execution mode, the program storage device 10 stores none of the insertion procedures 12 at the normal operation mode of the information processor. Then, immediately before the program dynamically changing unit 23 is started to enter the changed operation mode, a region for storing the insertion procedure 12 is ensured in the program storage device 10. This eliminates the need of using a region of the program storage device 10 for storing the insertion procedure 12 which is not used at the normal operation mode. As a result, more effective use of the program storage device 10 is possible than that according to the first embodiment.

Although according to the above-described first and second embodiments, addresses of embedding points are recorded in the procedure insertion table 24, a means for obtaining an address from a procedure name may be provided in the control device 20 and the procedure insertion table 24 may be designed to record, in place of an address of an embedding point, a procedure name of the embedding point.

In addition, while information regarding an embedding procedure recited in the procedure insertion table 24 is an address in the first embodiment and size and a recording position on the insertion procedure storage device 50 in the second embodiment, a means for obtaining these information from a procedure name may be provided at the control device 20 and the procedure insertion table 24 may be designed to record name of an insertion procedure in place of these information.

Furthermore, while in operation examples according to the first and the second embodiments, one instruction is saved from an embedding point each time, a plurality of instructions may be saved each time.

While in the embedding procedure according to the first embodiment, information is output as a hardware signal which can be observed outside the information processor, it is also possible to use an internal memory of the information processor as a recording device and record information at the recording device.

While in the second embodiment, processing for ensuring a region in the program storage device 10 is conducted every time processing of each insertion procedure is executed, it is also possible to first ensure regions for all the insertion procedures.

As described in the foregoing, the information processor of the present invention and the method therefor have the advantage of not only operating in a peculiar operation mode like a debugger but also dynamically changing operation of an operating system at the normal operation mode of the information processor. The reason for the advantage is that an instruction at an embedding point and an instruction to be executed last in an insertion procedure can be rewritten by the program dynamically changing means.

Another advantage is that while an information processor is in operation, operation of an operating system can be dynamically changed such that an arbitrary insertion procedure can be executed in the course of the execution of the operating system. This effect is produced by the execution of a series of processing of saving the contents of a register prior to the main processing of an insertion procedure and returning the saved contents of the register after the main processing, as well as executing an instruction saved in an instruction saving region to branch to an instruction subsequent to the saved instruction.

A further effect is reduction of a time required for calling an insertion procedure from an embedding point. The reason is that executed at an embedding point is an instruction branching to an insertion procedure and accordingly operation for detecting which procedure insertion position has been executed is unnecessary.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An information processor which rewrites instructions in a program to dynamically change structure of the program, comprising:

program storage means for storing a program; and control means for executing a program stored in said program storage means, said control means including a procedure insertion table in which information regarding an embedding point in said program and information regarding an insertion procedure to be inserted in the embedding point are described in correlation with each other, and program dynamically changing means for saving an instruction at said embedding point of said program held by said program storage means in an instruction saving region with reference to said procedure insertion table, rewriting the last instruction of said insertion procedure into a branch instruction to branch to an instruction subsequent to the saved instruction, and writing a branch instruction to branch to the insertion procedure at said embedding point, wherein at the time of execution of said insertion procedure, an instruction saved in said instruction saving region is executed immediately prior to execution of the last branch instruction.

2. The information processor as set forth in claim 1, further comprising recording means for recording predetermined data, wherein said control means further includes data output means for outputting measurement data indicative of operation conditions of the information processor detected by said insertion procedure to said recording means.

3. The information processor as set forth in claim 1, wherein said program storage means stores a procedure to be executed at the normal operation mode of the information processor and said insertion procedure.

4. The information processor as set forth in claim 1, further comprising, insertion procedure storage means for storing said insertion procedure independent of said program storage means, wherein said control means further includes assignment means for ensuring a region in said program storage means with reference to said procedure insertion table, as well as reading said insertion procedure from said insertion procedure storage means and storing the same in the region ensured in said program storage means prior to the processing by said program dynamically changing means.

5. An information processing method of rewriting instructions in a program to dynamically change structure of the program, comprising the steps of:

referring to a procedure insertion table in which information regarding an embedding point in the program and information regarding an insertion procedure to be inserted in the embedding point are described in correlation with each other to save an instruction at said embedding point of said program held by the program storage device in a predetermined instruction saving region, rewriting the last instruction of said insertion procedure into a branch instruction to branch to an instruction subsequent to a saved instruction, and writing a branch instruction to branch to said insertion procedure at said embedding point, wherein at the time of execution of said insertion procedure, an instruction saved in said instruction saving region is executed immediately prior to execution of the last branch instruction.

6. The information processing method as set forth in claim 5, wherein when said insertion procedure is executed, measurement data indicative of operation conditions of the information processor detected by said insertion procedure is output before the execution of an instruction saved in said instruction saving region.

7. The information processing method as set forth in claim 5, further comprising, prior to said instruction saving step, the steps of:

referring to said procedure insertion table to ensure a region of said program storage means, and storing said insertion procedure in the region of said program storage means ensured at said region ensuring step.

8. A computer readable memory storing a control program for controlling an information processor which rewrites instructions in a program to dynamically change structure of the program, said control program comprising the steps of:

referring to a procedure insertion table in which information regarding an embedding point in the program and information regarding an insertion procedure to be inserted in the embedding point are described in correlation with each other to save an instruction at said embedding point of said program held by the program storage device in a predetermined instruction saving region, rewriting the last instruction of said insertion procedure into a branch instruction to branch to an instruction subsequent to a saved instruction, and writing a branch instruction to branch to said insertion procedure at said embedding point, wherein at the time of execution of said insertion procedure, an instruction saved in said instruction saving region is executed immediately prior to execution of the last branch instruction.

9. The computer readable memory as set forth in claim 8, wherein said control program, when said insertion procedure is executed, outputs measurement data indicative of operation conditions of the information processor detected by said insertion procedure after the execution of an instruction saved in said instruction saving region.

10. The computer readable memory as set forth in claim 8, wherein said control program further comprising, prior to said instruction saving step, the steps of:

referring to said procedure insertion table to ensure a region of said program storage means, and storing said insertion procedure in the region of said program storage means ensured at said region ensuring step.

* * * * *